US006476975B1

(12) United States Patent
Yoshii et al.

(10) Patent No.: US 6,476,975 B1
(45) Date of Patent: Nov. 5, 2002

(54) MOTHER GLASS COMPOSITION FOR GRADED INDEX LENS

(75) Inventors: Tetsuro Yoshii, Osaka (JP); Shigeo Kittaka, Osaka (JP); Tadashi Koyama, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 59 days.

(21) Appl. No.: 09/709,715

(22) Filed: Nov. 13, 2000

(30) Foreign Application Priority Data

Nov. 11, 1999 (JP) .............................. 11-321054

(51) Int. Cl.⁷ .............................. G02B 9/00; C03C 3/097
(52) U.S. Cl. ........................ 359/652; 359/654; 501/63; 501/64; 501/72
(58) Field of Search .................................. 359/652, 654; 501/63, 64, 72

(56) References Cited

FOREIGN PATENT DOCUMENTS

| EP | 0 287 345 | 10/1988 |
|----|-----------|---------|
| EP | 0 657 391 A1 | 6/1995 |
| EP | 0 953 548 A1 | 11/1999 |
| JP | 57-95848 | 6/1982 |
| JP | 63-170247 | 7/1988 |
| JP | 11-302035 | 11/1999 |

*Primary Examiner*—Georgia Epps
*Assistant Examiner*—M. Hasan
(74) *Attorney, Agent, or Firm*—Sughrue Mion, PLLC

(57) ABSTRACT

An $SiO_2$-$TiO_2$-$Li_2O$-$Na_2O$-based glass composition containing no lead oxide having incorporated therein specific amounts of specific components which are selected from oxides of the metal elements having an atomic number of 30 (Y) to 73 (Ta) and which hardly cause coloration of glass. The glass composition has a desirable refractive index, hardly undergoes devitrification, and hardly develops cracks on ion exchanging and is suitable as glass for a graded index lens.

8 Claims, No Drawings

MOTHER GLASS COMPOSITION FOR GRADED INDEX LENS

BACKGROUND OF THE INVENTION

1. Field of the Invention

This invention relates to a mother glass (i.e., homogeneous glass before ion exchange) composition suited for producing graded index lenses having a refractive index gradient in its cross section. More particularly, it relates to a glass composition for graded index lenses, which is excellent in drawability and ion-exchanging properties.

2. Description of the Related Art

A graded index lens is a rod lens having a refractive index distribution in its cross section varying from the center axis toward the periphery. It has many advantages such that it has an image forming action even with flatness on both sides and can easily be processed into a microfine lens. Therefore, it has recently enjoyed wide application to an optical system for copiers, facsimiles, LED array printers, liquid crystal shutter printers, etc.

A graded index lens having such wide applicability is usually produced by an ion-exchange process, in which a glass body containing a first cation capable of constituting a modified oxide is immersed in a high-temperature molten salt containing a second cation capable of constituting a modified oxide to exchange the first cation in the glass body for the second cation in the molten salt thereby forming a refractive index distribution changing from the center of the glass body toward the periphery.

For example, it is known that a Cs-containing glass body undergoes ion exchange in a molten potassium nitrate to provide a graded index lens having excellent chromatic aberration (see JP-B-51-21594). The angular aperture of this lens is as small as about 10° at the most. JP-B-59-41934 discloses a process for obtaining a graded index lens having a greater angular aperture, in which Li-containing glass body is subjected to ion exchange in molten sodium nitrate.

However, experimentation following the working examples of JP-B-59-41934 revealed that the Abbe's number, which is a measure (index) of dispersion of light, of the composition containing lead oxide is as small as less than 40. The recent broadening of application of graded index lenses has demanded reduction of dispersion, namely, an increase of the Abbe's number. On the other hand, the composition containing no lead oxide has an extremely high devitrification temperature and is not fit for large-scale production. Further, a glass composition having no lead oxide tends to develop cracks on ion exchanging.

SUMMARY OF THE INVENTION

An object of the present invention is to provide a mother glass composition for graded index lenses which has a small dispersion and suitability to large-scale production.

In order to solve the above-described problems of conventional techniques, the present inventors have conducted extensive investigations and, as a result, have found that incorporation of specific amounts of specific components which are selected from oxides of the metal elements having an atomic number of 30 (Y) to 73 (Ta) and which hardly cause coloration into PbO-free $SiO_2$-$TiO_2$-$Li_2O$-$Na_2O$-based glass provides a glass composition which has a desirable refractive index, hardly undergoes devitrification, and hardly develops cracks on ion exchanging and is suitable as a mother glass composition for a graded index lens.

The mother glass composition for graded index lenses according to the invention comprises, as glass components,
- 45 to 65 mol % of $SiO_2$,
- 2 to 12 mol % of $TiO_2$,
- 2 to 22 mol % of MgO,
- 1 to 16 mol % of BaO,
- 8 to 10.5 mol % of $Li_2O$,
- 5 to 12 mol % of $Na_2O$, and
- 1 to 15 mol %, in total, of ZnO, $Y_2O_3$, $ZrO_2$, $Nb_2O_5$, $In_2O_3$, $La_2O_3$, and $Ta_2O_5$, provided that the content of ZnO is 0 to 5 mol% and the content of each of $Y_2O_3$, $ZrO_2$, $Nb_2O_5$, $In_2O_3$, $La_2O_3$, and $Ta_2O_5$ is 0 to 7 mol %.

The content of BaO is preferably equal to or less than that of MgO, in order to prevent devitrification. Furthermore, it is preferred that the content of ZnO is 1 to 5 mol % with the total content of ZnO, $ZrO_2$, $Y_2O_3$, and $La_2O_3$ being 3 to 10 mol %, in order to suppress crack development during ion exchange. Moreover, the total content of $Y_2O_3$ and $La_2O_3$ is preferably 1 to 9 mol %.

DETAILED DESCRIPTION OF THE INVENTION

EXAMPLES 1 TO 5

A mother glass composition shown in Table 1 below was formed into a rod having a diameter of 1.1 mm, and its refractive index, Abbe's number, and devitrification temperature were measured.

The glass rod was treated in a molten sodium nitrate bath under conditions shown in Table 1 to effect ion exchange. The resulting glass rod was inspected for surface opacity and cracks.

The glass rod was processed into a lens, and the lens performance such as an angular aperture was evaluated according to the following methods. The results obtained are shown in Table 1.

1) Angular Aperture

The glass rod was cut to appropriate lengths, and both cut sides were polished for mirror finish to obtain a rod lens. A checkered pattern was brought into contact with one side of the lens, and the length at which an image of the checkered pattern is obtained from the other side was obtained. A refractive index distribution coefficient √A was calculated from the length. The angular aperture θ was calculated from the √A, the radius $r_0$ of the glass rod, and the refractive index $n_0$ of the glass before ion exchange according to the following equation:

$$\sin(\theta) = \sqrt{A} \cdot n_0 \cdot r_0$$

2) Refractive Index

Obtained from the total reflection critical angle as measured with a Bulfrich refractometer.

3) Abbe's Number

Calculated from the refractive indices at wavelengths. of C-line (656.3 nm), d-line (587.6 nm) and F-line (486.1 nm).

4) Devitrification

The mother glass was broken into pieces having a diameter of about 1 mm and thoroughly washed with methanol. The broken pieces were put in a platinum boat of 200 mm in length, 12 mm in breadth, and 8 mm in. depth and maintained in a gradient furnace of 600 to 1025° C. for 1 hour. Development of devitrification was observed with the naked eye, and the degree of devitrification was graded A (imperceptible), B (slight) or C (considerable),

EXAMPLES 6 TO 10

A mother glass composition shown in Table 2 below was formed into a glass rod in the same manner as in Examples 1 to 5. The mother glass was evaluated in the same manner as in Examples 1 to 5. The results obtained are shown in Table 2.

It is seen that the angular apertures are generally slightly greater than those of Examples 1 to 5.

EXAMPLES 11 TO 15

A mother glass composition shown in Table 3 below was formed into a glass rod in the same manner as in Examples 1 to 10. The mother glass was evaluated in the same manner as in Examples 1 to 10. The results obtained are shown in Table 3. It is seen that the glass of Examples 11 to 15 is less susceptible to devitrification, and the resulting lenses have greater angular apertures than those of Examples 1 to 10. In addition the glass rods suffered from no opacity nor cracks which tend to develop on the surface during ion exchange.

EXAMPLES 16 TO 20

A mother glass composition shown in Table 4 below was formed into a glass rod in the same manner as in the foregoing Examples. The glass was evaluated in the same manner as in the foregoing Examples. The results obtained are shown in Table 4. It is seen that the glass is less susceptible to devitrification, and the lends have greater angular apertures than those of Examples 1 to 10. Further, the rods suffered from no opacity nor cracks which tend to develop on the surface during ion exchange. In addition, the graded index lenses prepared from these glass rods show improvement of lens performance over those of Examples 11 to 15.

COMPARATIVE EXAMPLES 1 TO 5

As is apparent from Tables 1 through 4, the glass compositions according to the present invention have an angular aperture (half angle) of 10° or more and an Abbe's number, which is indicative of dispersion, of 40 or more, proving less susceptibility to devitrification.

For comparison, glass rods were prepared from the comparative glass compositions shown in Table 5 below Although all the resulting glass rods have an angular aperture of 10° or more, the composition containing a lead compound has an Abbe's number of less than 40 which is unfavorable for use as a lens, and the compositions containing no lead compound and having an angular aperture of about 10° are extremely susceptible to devitrification.

Considering the results of the foregoing Examples overall, ranges of desirable mother glass compositions are specified as follows.

$SiO_2$ is a main component forming the glass network structure. If the $SiO_2$ content is less than 45 mol %, the composition does not vitrify. If it exceeds 65 mol %, the proportion assigned to the other components serving to reduce the melting temperature or to improve the refractive index is so limited that practical glass cannot be obtained $Li_2O$ is one of the most important components for ion exchange If the $Li_2O$ content is less than 8 mol %, the refractive index difference obtained by ion exchange is too small to obtain a sufficient angular aperture for practical use. If the $Li_2O$ content is more than 10.5 mol %, the glass is apt to undergo devitrification.

$Na_2O$ is essential for controlling the rate of ion exchange and reducing the melting temperature. If its content is less than 5 mol %, the rate of ion exchange considerably decreases, and the melting temperature markedly increases. More than 12 mol % of $Na_2O$ causes reduction in chemical durability.

$TiO_2$ is essential for increasing the refractive index. The effect of less than 2 mol % of $TiO_2$ is insubstantial. If the $TiO_2$ content exceeds 15 mol %, the glass tends to undergo devitrification.

MgO is essential for lowering the melting temperature and making the refractive index difference greater in ion exchange treatment. Less than 2 mol % is ineffective, and more than 22 mol % tends to cause devitrification.

BaO is, while not essential, makes the glass less susceptible to devitrification in cooperation with MgO Addition of more than 16 mol % of BaO tends to cause devitrification.

Each of ZnO, $Y_2O_3$, $ZrO_2$, $Nb_2O_5$, $In_2O_3$, $La_2O_3$, and $Ta_2O_5$ is not essential but effective in increasing the refractive index. They are more effective when used as a combination of two or more thereof than used alone particularly in preventing devitrification. Note that addition of more than 7 mol % of any one of them makes the glass susceptible to devitrification. Where two or more of them are used in combination, the total content should not exceed 15 mol %. Otherwise the glass tends to be devitrified.

With respect to the ratio of MgO and BaO, it was ascertained that a composition containing no BaO produces a large refractive index difference by ion exchange but tends to undergo devitrification. According as MgO is displaced with BaO up to a BaO/MgO molar ratio of 1, the tendency to devitrification is improved while the refractive index difference by ion exchange is slightly reduced. If the BaO to MgO molar ratio is further increased, not only is the refractive index difference made smaller but also the tendency to devitrification increases. The BaO/MgO ratio can be decided taking into consideration the effects of the other components on refractive index difference and devitrification tendency. To increase the BaO content over the MgO content is no effective means for both the refractive index difference and prevention of devitrification.

Lead-free glass has a relatively large Abbe's number but is liable to develop cracks during ion exchange. This tendency can be coped with by incorporating 1 to 5 mol % of ZnO. Taking the effect produced into consideration in view of the balance with the refractive index, etc., it is desirable in this case that the total amount of ZnO, $ZrO_2$, $Y_2O_3$ and $La_2O_3$ be within a range of from 3 to 10 mol %.

Where the total amount of $Y_2O_3$ and $La_2O_3$ is limited within a range of from 1 to 9 mol %, the glass composition provides on ion exchanging graded index lenses having further improved lens performance.

If desired, the glass composition of the invention can further comprise, as auxiliary components, 0 to 3 mol % of $K_2O$, 0 to 5 mol % of CaO, 0 to 5 mol % of SrO, 0 to 1 mol % of SnO, 0 to 5 mol % of $B_2O_3$, 0 to 5 mol % of $Al_2O_3$, 0 to 3 mol % of $Bi_2O_3$, 0 to 3 mol % of $Ce_2O_3$, 0 to 3 mol % of $WO_3$, and 0 to 0.5 mol % of $As_2O_3$. Incorporation of these auxiliary components will enable fine control on angular aperture or solubility.

TABLE 1

| (mol %) | Example No. 1 | 2 | 3 | 4 | 5 |
|---|---|---|---|---|---|
| SiO$_2$ | 47.5 | 54.0 | 61.0 | 50.0 | 50.0 |
| TiO$_2$ | 10.0 | 8.0 | 3.0 | 5.0 | 5.0 |
| MgO | 8.0 | 3.5 | 7.0 | 8.0 | 14.0 |
| BaO | 9.0 | 12.0 | 9.0 | 9.5 | 6.0 |
| Li$_2$O | 8.5 | 8.0 | 9.0 | 10.5 | 8.3 |
| Na$_2$O | 10.0 | 10.0 | 8.0 | 9.0 | 11.4 |
| ZnO | | 2.5 | | | 1.0 |
| La$_2$O$_3$ | | | | 3.0 | |
| Y$_2$O$_3$ | | | 1.0 | | 2.5 |
| In$_2$O$_3$ | 1.0 | | | | |
| ZrO$_2$ | | | | | 1.8 |
| Nb$_2$O$_5$ | | | 2.0 | | |
| Ta$_2$O$_5$ | | 1.5 | | | |
| PbO | | | | | |
| Others | Al$_2$O$_3$: 2.0  K$_2$O: 3.0 | CaO: 0.5 | | CaO: 2.0  SrO: 3 | |
| Refractive Index | 1.641 | 1.646 | 1.621 | 1.618 | 1.612 |
| Abbe's Number | 45.39 | 45.19 | 44.91 | 46.89 | 49.60 |
| Devitrification | A | B | B | A | B |
| Ion Exchange Temp. (° C.) | 520 | 520 | 520 | 520 | 520 |
| Ion Exchange Time (hr) | 40 | 25 | 60 | 50 | 45 |
| Ion Exchange Opacity or Cracks | none | slight | slight | slight | slight |
| Angular aperture (°) | 10.2 | 10.4 | 10.3 | 10.4 | 10.4 |
| Lens Performance | good | good | good | good | good |

TABLE 2

| (mol %) | Example No. 6 | 7 | 8 | 9 | 10 |
|---|---|---|---|---|---|
| SiO$_2$ | 51.1 | 63.4 | 57.0 | 60.0 | 54.5 |
| TiO$_2$ | 8.4 | 5.0 | 5.5 | 3.0 | 7.0 |
| MgO | 12.6 | 5.9 | 12.0 | 6.0 | 8.0 |
| BaO | 3.8 | 4.6 | 3.0 | 4.0 | 8.0 |
| Li$_2$O | 9.8 | 10.0 | 8.5 | 8.0 | 9.5 |
| Na$_2$O | 8.3 | 7.8 | 9.0 | 11.0 | 9.0 |
| ZnO | | | | | 0.5 |
| La$_2$O$_3$ | | | | | 2.5 |
| Y$_2$O$_3$ | 2.5 | | | 1.0 | |
| In$_2$O$_3$ | | | 4.0 | | |
| ZrO$_2$ | 3.5 | | | | |
| Nb$_2$O$_5$ | | 3.3 | | | |
| Ta$_2$O$_5$ | | | | | 6.0 |
| PbO | | | | | |
| Others | | | SrO: 1.0 | SnO: 0.5  B$_2$O$_3$: 0.5 | Al$_2$O$_3$: 1.0 |
| Refractive Index | 1.615 | 1.620 | 1.614 | 1.628 | 1.630 |
| Abbe's Number | 48.72 | 45.23 | 45.64 | 46.28 | 41.82 |
| Devitrification | B | A | B | B | A |
| Ion Exchange Temp. (° C.) | 520 | 520 | 520 | 520 | 520 |
| Ion Exchange Time (hr) | 65 | 50 | 45 | 60 | 50 |
| Ion Exchange Opacity or Cracks | slight | none | none | slight | none |
| Angular aperture (°) | 11.1 | 10.6 | 10.7 | 10.9 | 10.4 |
| Lens Performance | good | good | good | good | good |

TABLE 3

| (mol %) | Example No. | | | | |
|---|---|---|---|---|---|
| | 11 | 12 | 13 | 14 | 15 |
| $SiO_2$ | 48.0 | 51.0 | 55.0 | 53.0 | 60.0 |
| $TiO_2$ | 3.5 | 4.0 | 5.0 | 6.0 | 6.0 |
| MgO | 12.0 | 11.0 | 7.0 | 7.0 | 6.5 |
| BaO | 9.0 | 10.0 | 8.0 | 9.0 | 7.5 |
| $Li_2O$ | 10.0 | 9.0 | 8.5 | 8.5 | 9.0 |
| $Na_2O$ | 10.0 | 8.5 | 10.0 | 7.0 | 7.0 |
| ZnO | 3.0 | 2.0 | 1.5 | 3.0 | 1.0 |
| $La_2O_3$ | | 0.5 | | | |
| $Y_2O_3$ | 0.5 | | | | |
| $In_2O_3$ | | | | | 1.0 |
| $ZrO_2$ | 4.0 | 4.0 | 5.0 | 5.0 | 2.0 |
| $Nb_2O_5$ | | | | | |
| $Ta_2O_5$ | | | | | |
| PbO | | | | | |
| Others | | | | $K_2O$: 1.5 | |
| Refractive Index | 1.619 | 1.623 | 1.620 | 1.630 | 1.616 |
| Abbe's Number | 47.47 | 47.93 | 48.03 | 47.65 | 48.52 |
| Devitrification | A | A | A | A | A |
| Ion Exchange Temp. (° C.) | 520 | 520 | 520 | 520 | 520 |
| Ion Exchange Time (hr) | 45 | 45 | 50 | 40 | 40 |
| Ion Exchange Opacity or Cracks | none | none | none | none | none |
| Angular aperture (°) | 12.0 | 11.2 | 11.7 | 11.9 | 11.9 |
| Lens Performance | good | very good | very good | good | good |

TABLE 4

| (mol %) | Example No. | | | | |
|---|---|---|---|---|---|
| | 16 | 17 | 18 | 19 | 20 |
| $SiO_2$ | 56.0 | 60.7 | 50.0 | 55.0 | 48.5 |
| $TiO_2$ | 3.5 | 7.8 | 5.0 | 2.5 | 3.5 |
| MgO | 8.0 | 7.2 | 14.0 | 11.4 | 14.0 |
| BaO | 8.0 | 3.9 | 6.0 | 0.0 | 7.0 |
| $Li_2O$ | 9.5 | 9.5 | 8.3 | 10.5 | 10.0 |
| $Na_2O$ | 9.0 | 7.9 | 11.4 | 12.0 | 10.0 |
| ZnO | 4.0 | 1.4 | 1.0 | 1.0 | 2.0 |
| $La_2O_3$ | 2.0 | | | 3.0 | 2.0 |
| $Y_2O_3$ | | 1.6 | 2.5 | 1.0 | 1.5 |
| $In_2O_3$ | | | | | |
| $ZrO_2$ | | | 1.8 | 2.0 | 1.5 |
| $Nb_2O_5$ | | | | | |
| $Ta_2O_{15}$ | | | | | |
| PbO | | | | | |
| Others | | | | SrO: 2.5 | $Al_2O_3$: 1.0 |
| Refractive Index | 1.621 | 1.618 | 1.612 | 1.621 | 1.628 |
| Abbe's Number | 48.68 | 46.89 | 49.60 | 48.65 | 42.63 |
| Devitrification | A | A | A | A | A |
| Ion Exchange Temp. (° C.) | 520 | 520 | 520 | 520 | 520 |
| Ion Exchange Time (hr) | 30 | 35 | 45 | 45 | 40 |
| Ion Exchange Opacity or Cracks | none | none | none | none | none |
| Angular aperture (°) | 12.1 | 11.5 | 11.7 | 11.5 | 12.4 |
| Lens Performance | very good | very good | very good | very good | very good |

TABLE 5

| (mol %) | Comparative Example No. | | | |
|---|---|---|---|---|
| | 1 | 2 | 3 | 4 |
| SiO$_2$ | 50.0 | 30.0 | 50.0 | 45.0 |
| TiO$_2$ | 10.0 | 10.0 | 8.0 | 15.0 |
| MgO | 10.0 | 16.0 | 18.0 | 20.0 |
| BaO | | | | |
| Li$_2$O | 8.0 | 10.0 | 8.0 | 12.0 |
| Na$_2$O | 12.0 | 10.0 | 16.0 | 8.0 |
| ZnO | | | | |
| La$_2$O$_3$ | | | | |
| Y$_2$O$_3$ | | | | |
| In$_2$O$_3$ | | | | |
| ZrO$_2$ | | | | |
| Nb$_2$O$_5$ | | | | |
| Ta$_2$O$_5$ | | | | |
| PbO | 10.0 | 4.0 | | |
| Others | | B$_2$O$_3$: 20 | | |
| Refractive Index | 1.652 | 1.623 | 1.596 | 1.631 |
| Abbe's Number | 37.80 | 39.10 | | |
| Devitrification | A | B | C | C |
| Ion Exchange Temp. (° C.) | 520 | 520 | 520 | 520 |
| Ion Exchange Time (hr) | 29 | 72 | 39 | 53 |
| Ion Exchange Opacity or Cracks | none | none | observed | observed |
| Angular aperture (°) | 10.0 | 11.4 | 11.5 | 11.2 |
| Lens Performance | good | good | acceptable | good |

The present invention provides glass for graded index lenses which has reduced dispersion to secure improved lens performance and which hardly undergoes devitrification and thereby exhibits improved drawability.

The entire disclosure of each and every foreign patent application from which the benefit of foreign priority has been claimed in the present application is incorporated herein by reference, as if fully set forth.

We claim:

1. A mother glass composition for graded index lenses comprising the glass components:
   45 to 65 mol % of SiO$_2$;
   2 to 12 mol % of TiO$_2$;
   2 to 22 mol % of MgO;
   0 to 16 mol % of BaO;
   8 to 10.5 mol % of Li$_2$O;
   5 to 12 mol % of Na$_2$O; and
   1 to 15 mol %, in total, of ZnO, Y$_2$O$_3$, ZrO$_2$, Nb$_2$O$_5$, In$_2$O$_3$, La$_2$O$_3$ and Ta$_2$O$_5$, provided that the content of ZnO is 1 to 5 mol %, the total content of ZnO, ZrO$_2$, Y$_2$O$_3$ and La$_2$O$_3$ is 3 to 10 mol %, and the content of each of Y$_2$O$_3$, ZrO$_2$, Nb$_2$O$_5$, In$_2$O$_3$, La$_2$O$_3$, and Ta$_2$O$_5$ is 0 to 7 mol %.

2. The glass composition for graded index lenses according to claim 1, wherein the content of BaO is equal to or less than that of MgO.

3. The glass composition for graded index lenses according to claim 1, wherein the total content of Y$_2$O$_3$ and La$_2$O$_3$ is 1 to 9 mol %.

4. The glass composition for graded index lenses according to claim 1, which does not contain lead oxide.

5. A graded index lens comprising a mother glass composition, wherein the mother glass composition comprises the glass components:
   45 to 65 mol % of SiO$_2$;
   2 to 12 mol % of TiO$_2$;
   2 to 22 mol % of MgO;
   0 to 16 mol % of BaO;
   8 to 10.5 mol % of Li$_2$O;
   5 to 12 mol % of Na$_2$O; and
   1 to 15 mol %, in total, of ZnO, Y$_2$O$_3$, ZrO$_2$, Nb$_2$O$_5$, In$_2$O$_3$, La$_2$O$_3$ and Ta$_2$O$_5$, provide that the content of ZnO is 1 to 5 mol %, the total content of ZnO, ZrO$_2$, Y$_2$O$_3$ and La$_2$O$_3$ is 3 to 10 mol %, and the content of each of Y$_2$O$_3$, ZrO$_2$, Nb$_2$O$_5$, In$_2$O$_3$, La$_2$O$_3$ and Ta$_2$O$_5$ is 0 to 7 mol %.

6. The graded index lens according to claim 5, wherein the content of BaO is equal to or less than that of MgO.

7. The graded index lens according to claim 5, wherein the total content of Y$_2$O$_3$ and La$_2$O$_3$ is 1 to 9 mol %.

8. The graded index lens according to claim 5, which does not contain lead oxide.

* * * * *